United States Patent [19]

Bottorf

[11] Patent Number: 4,845,631

[45] Date of Patent: Jul. 4, 1989

[54] SCROLLING IMAGE MEMORY FOR HIGH SPEED AVIONICS MOVING MAP DISPLAY

[75] Inventor: Scott A. Bottorf, Cedar Rapids, Iowa

[73] Assignee: Rockwell International Corporation, El Segundo, Calif.

[21] Appl. No.: 33,299

[22] Filed: Mar. 31, 1987

[51] Int. Cl.[4] .............................................. G06F 15/20

[52] U.S. Cl. .................................... 364/443; 364/521; 340/995; 340/799

[58] Field of Search ............... 364/521, 518, 449, 433, 364/460, 200, 900; 340/727, 731, 745, 798, 799, 990, 995, 988

[56] References Cited

U.S. PATENT DOCUMENTS

| | | | |
|---|---|---|---|
| 4,086,632 | 4/1978 | Lions | 364/444 |
| 4,360,876 | 11/1982 | Girault et al. | 364/449 |
| 4,477,802 | 10/1984 | Walter et al. | 340/727 |
| 4,484,192 | 11/1984 | Seitz et al. | 340/995 |
| 4,511,973 | 4/1985 | Miura et al. | 364/449 |
| 4,527,155 | 7/1985 | Yamaki et al. | 340/990 |
| 4,591,850 | 5/1986 | Lundström | 340/799 |
| 4,602,251 | 7/1986 | Sawada et al. | 340/799 |
| 4,608,656 | 8/1986 | Tanaka et al. | 364/449 |
| 4,648,045 | 3/1987 | Demetresco | 340/799 |
| 4,653,112 | 3/1987 | Omimette | 364/131 |
| 4,660,029 | 4/1987 | Houda et al. | 340/744 |
| 4,737,916 | 4/1988 | Ogawa et al. | 364/443 |

OTHER PUBLICATIONS

*Computer Graphics*, vol. 18, No. 3, Jul. 1984, "Simulation of Natural Scenes Using Textured Quadratic Surfaces" by Geoffrey Y. Gardner, pp. 11-20.

*Primary Examiner*—Gary Chin
*Assistant Examiner*—Thomas G. Black
*Attorney, Agent, or Firm*—Gregory G. Williams; M. Lee Murrah; H. Fredrick Hamann

[57] ABSTRACT

A multichannel moving map display for high speed aircraft which utilizes a scrolling image memory which is arranged logically in an N+1×N+1 geometric array of memory cells and having an N×N active area for scanning by an image processor and a 2N+1 memory cell buffer area for loading updating information into the image memory and later redefining the active and buffer areas in order to allow for updating to occur.

9 Claims, 1 Drawing Sheet

SCROLLING IMAGE MEMORY FOR HIGH SPEED AVIONICS MOVING MAP DISPLAY

BACKGROUND OF THE INVENTION

Cross-reference to Related Applications:

This application relates to the subject matter of a co-pending application by Scott A. Bottorf, Jeffrey D. Russell, and Conway A. Southard, entitled "Moving Map Display", filed on even data herewith and assigned to the same assignee, the Ser. No. of which is 033,298; and to a co-pending application by Scott A. Bottorf, entitled "Surface Texture Generator for Graphics Displays", filed on even data herewith and assigned to the same assignee, the Ser. No. of which is 033,300; the subject matter of both of these applications is incorporated herein by this reference.

Field of the Invention:

The present invention generally relates to avionics moving map displays, and more particularly, is concerned with moving map displays for use in relatively high-speed aircraft, and even more particularly, relates to scrolling image memories for such displays capable of simultaneous loading and displaying of data.

In recent years, in both commercial and military avionics, there has been an expanding requirement for high performance displays to alleviate the problems associated with increased mission complexity, sophisticated avionics capabilities, high crew workload levels, and multisensor weapons systems. It is often desirable for a moving map display to provide the pilot of an aircraft with a display of the terrain over which he is flying his aircraft. Obviously, the update rate necessary to display the terrain below is a function of the aircraft speed, and with the recent advent of low-flying supersonic bombers. the need to rapidly update the moving map display is quickly becoming an important hurdle for avionics engineers.

One system for providing a pilot with a moving map display has been disclosed in U.S. Pat. No. 4,484,192 to William R. Seitz, which is hereby incorporated herein by this reference. The Seitz patent discloses a moving map display system which utilizes a scan memory for storing image data of the area immediately surrounding the vehicle which is to be displayed. As the aircraft travels across the terrain, the image data is updated in the scan memory by providing blanking signals or gaps in the signal from the scan memory to the display. During these blanking signals or gaps, the scan memory is updated with new image data.

Another possible approach is to use a dual blank image memory where the image data is input into one memory bank while the other bank is being scanned.

While these systems, or variations of them, have been used for updating image data in a moving map displays, they do not serious drawbacks. One major drawback with the Seitz design is the inability to rapidly update the image data to the scan memory because the access thereto is limited in time to brief blanking signals. The blanking signals are constrained in duration and frequency by the need to provide a display without visible interruptions or flickering. One drawback of the dual bank image memory is the requirement for two complete memories with the concomitant additional expense, but most importantly, each update would require the full bank of memory to be loaded, thereby causing an unattractive high data transfer rate to occur, because of the loading of much redundant data.

Consequently, a need exists for improvements in image data update for moving map displays which result in an increase image data update rate, while not doubling the image memory.

SUMMARY OF THE INVENTION

It is an object of the present invention to increase the image data update rate of an avionics moving map display.

It is a feature of the present invention to utilize a scrolling image memory.

It is an advantage of the present invention to eliminate the need for blanking signals to the display while concomitantly providing continuous and simultaneous image data loading and unloading.

The present invention provides a scrolling image memory for an avionics moving map display designed to satisfy the aforementioned need, produce the previously-propounded object, include the above-described feature, and achieve the disclosed advantage. An avionics moving map display is provided in a "video blanking-less" display, in the sense that the need to blank the video signal to the display is eliminated. Instead, a constant video signal is provided to the display while the updating image data is allowed continuous access to the memory.

Accordingly, the present invention relates to an apparatus and method for simultaneously loading and displaying image data into and from an image memory for an avionics moving map display, which comprises a memory having an "active" area for current output of image data and a "buffer" area which is available for input of new data.

BRIEF DESCRIPTION OF THE DRAWINGS

The invention will be better understood by a reading of the description in conjunction with the drawings, in which.

DETAILED DESCRIPTION

In an image processing system, motion, such as a position on a map for a moving body, is shown by translating a viewport about an image memory, which may be a single fixed memory. For limited ranges of motion, this is sufficient, but for unlimited movement, such as a cross-country flight, it is impractical to store all the data required in a single image memory; some mass storage device, such as a disk, etc., is necessary. The contents of the image memory must then be periodically updated from the disk. It is highly desirable to have constant access to the memory, with no sharing between input and output functions.

Figure 3:
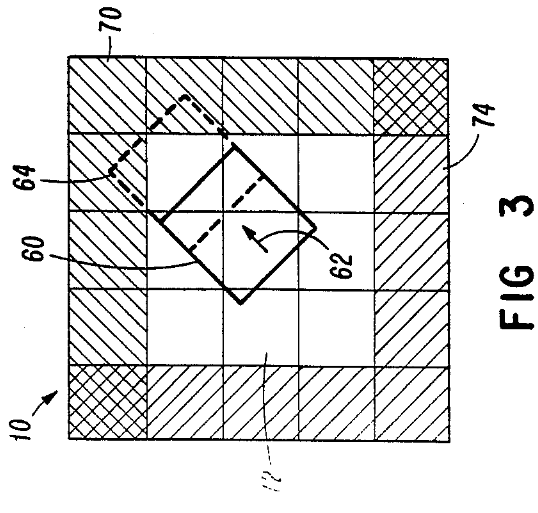
FIG. 3 is a geometric representation of the scrolling image memory of the present invention, with a traveling viewboard superimposed thereon, together with a current buffer area and a next buffer area.
Figure 4A:
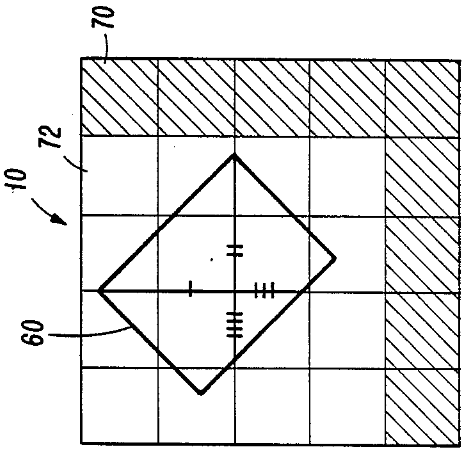
FIG. 4A is a schematic geographical representation of the logical memory of the scrolling image memory of the present invention with a viewboard in the active area and a buffer area.

The scrolling image memory of the present invention basically comprises an array of memory cells 10, which is shown in FIG. 4A, is a 5×5 logical configuration but any suitable alternative configuration may be substituted. This array of cells 10 comprises a buffer area 70 and an active area 72 having a viewport 60 therein. The viewport 60 is shown as a rectangular frame positioned within the active area, 72, which is that portion of the image memory which is available fro scanning access. The viewport 60 can be though of as being capable of translation, rotation, expansion, and contraction throughout the active area 72 of the image memory, which is utilized as a geometric array for simplicity. The buffer area 70 is that portion of the image memory which is available for input of new image data, and is not available for scanning access by the image processor. When the buffer area 70 is completely filled, it can be relabeled as an active area and thereby allow the image processor to san the newly-loaded information and consequently allow a portion of the previous active area 72 to be labeled as the next buffer area. This concept may be more fully understood when considered with FIG. 3, wherein there is shown an array of memory cells generally designated 10 having a rectangular frame of viewport 60 therein, which is disposed within an active area 72 which comprises all the image memory cells except those in the top row and in the right hand column, which comprise the buffer area 70. The view port 60 is schematically shown as having a direction of motion indicated by motion vector 62, pointing toward the upper right-hand corner of the array of cells 10. The viewport 60 is expected to move to a new location represented by a dashed rectangular frame 64, which is a translation of viewport 60 in the direction of motion vector 62. As the viewport translates toward the upper right-hand corner of the array of cells 10, it approaches the limits of the active area 72 of the array of cells 10. The CPU anticipates the motion of the viewport and provides for a buffer region 70 in a logical location in the top row and right-hand column of the array of cells 10, which is represented by slanted parallel lines extending upwards at an approximate 45 degree angle from left to right. Before the viewport 60 runs out of room in the active area 72, the CPU has provided for the filling of additional image data into the buffer region 70 and subsequently relabeling that region as a new portion of the active area 72, thereby creating a new buffer area 74 which comprises the bottom row and the left-hand column of the array of cells 10, and is represented by a series of parallel diagonal lines extending downward at approximately 45 degrees from left to right. The array of cells 10 can be though of as an $N+1$ by $N+1$ array, having an active area that is N by N. In such an arrangement, there are $2N+1$ cells which are not in the active area, and are available for input of new image data. One major advantage of the present system is that the active area of the image memory can be updated by updating only a portion of the overall image memory. If a dual bank memory, where each bank is equal to the size of the active memory, there would be $N^2$ cells that would necessarily have to be filled before an update could be made. The present invention provides that in order for an update of an N by N active area, only $2N+1$ cells must be updated. When the array of cells 10 has a larger number of cells, i.e., N is a large number, then benefits of the present invention become more pronounced. Simple differential calculus provides that the rate of increase of the number of cells necessary to be filled in order to update a dual bank system is 2N, where in the system of the present invention, an increase of one in N provides for an increase of two in the necessary cells for an active area update.

Obviously, the logical and geometrical design of the array of cells 10 with the buffer zone 70 being on the outside edge as in FIG. 3, will only be applicable at the time the viewport starts to move and for a short time thereafter. Eventually, the buffer region will be situated as buffer region 74 in the array of cells 10, but logically would include data not in the lower left-hand corner of a translating map, but would include data in the upper right-hand corner of a translating map. In order to facilitate an easy understanding of the arrangement of the numerous memory cells as depicted in FIG. 3, further information as shown in FIG. 4A is necessary.

Figure 4B:
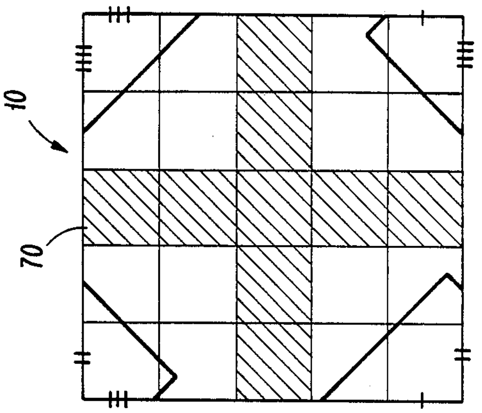
FIG. 4B is a schematic representation of the physical memory of the scrolling image memory of the present invention, with the viewboard pieces distributed throughout the active area, together with a buffer area.

The viewport 60 is shown to be divided into several parts, each of which has two internal edges, which are shared with another of the viewport parts. Each edge is shown to have a different label, characterized by the number of slash marks perpendicular to the shared edge. As the viewport 60 continues to move, the active area will not maintain a rectangular configuration without interruption; in fact, the active area may more closely resemble the array of cells generally designated 10 in FIG. 4B, having a buffer area 70 which is separating the parts of the active area, in a logical and geometrical configuration as shown in FIG. 3.

The image processor views the viewport as a logical and geometrical array of memory cells, but in fact the memory cells within the scrolling image memory can be arranged in any configuration, and typically the relationship of several memory cells in a typical memory is in a linear fashion, the logical and geometrical arrangement of the array of cells 10 is utilized for simplicity in understanding in cooperation with the image processor.

Figure 1:
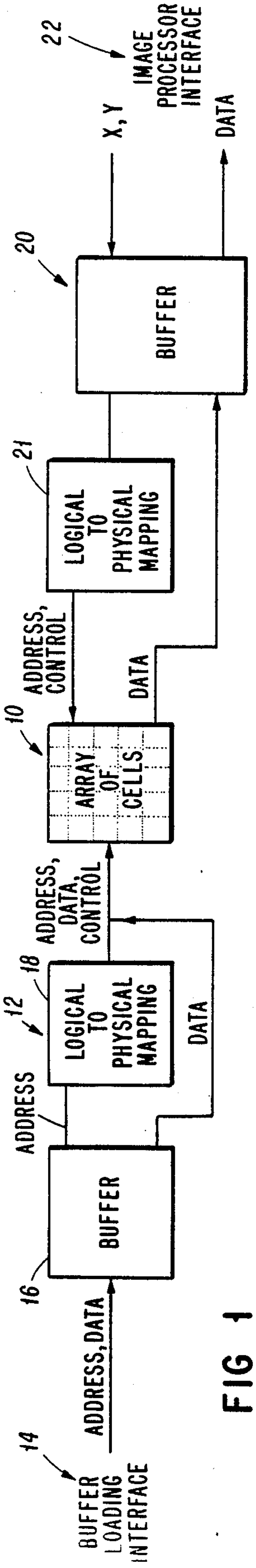
FIG. 1 is a schematic representation of the scrolling image memory of the present invention, comprising an array of cells, together with a schematic representation of the immediate input and output environs.

The invention of the present application is essentially embodied in a system which is schematically shown in FIG. 1, which shows generally an array of memory cells 10 having several inputs and outputs. The topographical data together with the necessary addresses is input into the array 10 through an input sequence generally designated 12 having a buffing/loading interface 14 which cooperates with a mass storage device and CPU (not shown). The topographical data together with the appropriate addresses is then input into buffer 16 and therethrough. The internal cell addresses are split from the topographical data and are processed through the logical-to-physical mapping device 18 which provides additional bits of information in the address to convert the logical memory address to the actual physical address. The data that is combined with the addressed and input into each of the buffer cells in the array of cells 10. The active side of the array, generally designated 20, provides as an input to the array of cells 10 certain addresses which define the active area of the array of cells 10 to be viewed by the image processor (not shown) through the image processor interface 22. The output data is linked to the image processor thereby allowing the image processor to scan the active areas of the array of cells 10.

Figure 2:
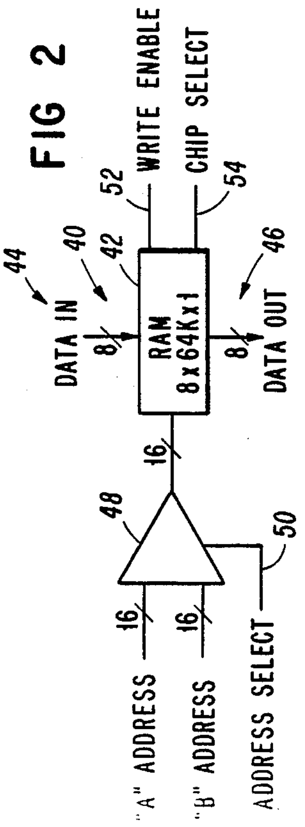
FIG. 2 is a schematic representation of one memory cell having the active/buffer addresses and selects together with the write enable and chip select.

In FIG. 2, there is shown a single cell, generally designated 40, which is an identical example of every other cell in the array of cells 10. Single cell 40, having a memory cell 42, is shown to be 8×64K×1 in RAM, but any suitable memory device may be substituted. There is shown a data input 44 with eight lines input and a data output 46, also with eight lines. Each cell must have addressing capability which can be provided by an address selector 48 having 16 lines of "a" address input and sixteen lines of "b" address input together with an address select. The appropriate address then is combined with the data into the memory cell 42. The write enable line 52 and the chip select line 54, which must be manipulated in order to write data and addresses into the memory cell 42.

It is though that the scrolling image memory for high speed avionics moving map displays of the present invention, and many of its attendant advantages, will be understood from the foregoing description, and it will be apparent that various changes may be made in the form, construction, and arrangement of the parts thereof, without departing from the spirit and scope of the invention, or sacrificing all of their material advantages, the forms hereinbefore being merely preferred or exemplary embodiments thereof. It is the intention of the appended claims to cover all of such changes.

I claim:

1. An image memory for avionics moving map displays, of the type having a system CPU, a mass storage device, and an image processor; the memory comprising:

a. a plurality of cells, each operatively coupled with the system CPU, the mass storage device and the image processor, and each cell being individually addressable and either receiving or outputting data irrespective of whether, simultaneously, any other cell is either outputting or receiving data;

b. a first portion of said plurality of cells for receiving input of data from the system CPU and the mass storage device;

c. a second portion of said plurality of cells for outputting data for scanning by the image processor.

2. An image memory as recited in claim 1 further comprising said first portion of said plurality of cells and said second portion of said plurality of cells each being individually addressable for either input or output, irrespective of the operation of the remainder of said plurality of cells for allowing redefinition in order to facilitate an exchange of a portion of said first portion of said plurality of cells with a portion of said second portion of said plurality of cells.

3. An image memory as recited in claim 2 further comprising said plurality of memory cells comprising an N+1 by N+1 rectangular array of memory cells.

4. An image memory as recited in claim 3 further comprising said first portion of said plurality of memory cells comprising an N by N rectangular array of memory cells.

5. An image memory as recited in claim 4 further comprising said second portion of said plurality of memory cells comprising 2N+1 memory cells.

6. A scrolling image memory for high speed avionics moving map displays comprising:

a. a plurality of individually addressable cells, which are each simultaneously operable with any other cell of the plurality of cells;

b. a data input into each of said plurality of cells;

c. a data output from each of said plurality of cells;

d. a write enable switch for each of said plurality of cells.

e. a chip select switch for each of said plurality of cells;

f. an active area address for each of said plurality of cells;

g. a buffer area address for each of said plurality of cells; and h. an address select for each of said plurality of cells.

7. A scrolling image memory of claim 6 further comprising said plurality of memory cells being geometrically arranged in a rectangular array.

8. A scrolling image memory of claim 7 further comprising said plurality of memory cells having a first portion and a second portion.

9. A scrolling image memory of claim 8 further comprising said first portion of said plurality of memory cells being arranged in a N+N rectangular geometric array when said plurality of memory cells are arranged in an N+1 by N+1 rectangular geometric array, and said second portion of said plurality of memory cells comprising 2N+1 memory cells.

* * * * *